(12) United States Patent
Shigeta

(10) Patent No.: US 10,948,369 B2
(45) Date of Patent: Mar. 16, 2021

(54) TORQUE SENSOR AND STEERING DEVICE

(71) Applicant: NSK LTD., Tokyo (JP)

(72) Inventor: Taishi Shigeta, Gunma (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 16/647,948

(22) PCT Filed: Sep. 19, 2018

(86) PCT No.: PCT/JP2018/034638
§ 371 (c)(1),
(2) Date: Mar. 17, 2020

(87) PCT Pub. No.: WO2019/059230
PCT Pub. Date: Mar. 28, 2019

(65) Prior Publication Data
US 2020/0386636 A1 Dec. 10, 2020

(30) Foreign Application Priority Data

Sep. 20, 2017 (JP) .............................. JP2017-180412

(51) Int. Cl.
*G01L 3/10* (2006.01)
*B62D 5/04* (2006.01)
*G01L 5/22* (2006.01)
(52) U.S. Cl.
CPC ............ *G01L 3/104* (2013.01); *B62D 5/0481* (2013.01); *G01L 5/221* (2013.01)
(58) Field of Classification Search
CPC ........ G01L 3/104; G01L 5/221; B62D 5/0481
See application file for complete search history.

(56) References Cited

U.S. PATENT DOCUMENTS 9,004,221 B2 * 4/2015 Yoshida .................. G01L 5/221
                                                          180/444
9,400,290 B2 * 7/2016 Lee .......................... G01L 3/104
(Continued)

FOREIGN PATENT DOCUMENTS

JP    2014-055909 A    3/2014
JP    2015-219152 A    12/2015
(Continued)

OTHER PUBLICATIONS

International Search Report for PCT/JP2018/034638 dated Oct. 16, 2018 [PCT/ISA/210].
(Continued)

*Primary Examiner* — Freddie Kirkland, III
(74) *Attorney, Agent, or Firm* — Sughrue Mion, PLLC

(57) ABSTRACT

A torque sensor includes a sensor housing, a first sleeve attached to a first rotating member that rotates with respect to the sensor housing, a magnet attached to the first sleeve, a second sleeve attached to a second rotating member coupled to the first rotating member via a torsion bar, a carrier attached to the second sleeve, a yoke attached to the carrier and opposing the magnet in a radial direction orthogonal to a shaft direction that is a longitudinal direction of the first rotating member, and a magnetic flux collecting member attached to the sensor housing and opposing the yoke in the shaft direction. The carrier opposes an opposing end surface of either one of the first sleeve and the magnet in the shaft direction. A length of a gap between the carrier and the opposing end surface in the shaft direction is smaller than a length of a gap between the yoke and the magnetic flux collecting member in the shaft direction.

7 Claims, 11 Drawing Sheets

(56) References Cited

U.S. PATENT DOCUMENTS

| | | | |
|---|---|---|---|
| 9,689,761 B2* | 6/2017 | Matsui | G01L 5/221 |
| 10,180,366 B2* | 1/2019 | Yoneda | G01L 3/104 |
| 2014/0076654 A1 | 3/2014 | Yoshida et al. | |
| 2015/0090051 A1 | 4/2015 | Lee | |
| 2015/0330849 A1 | 11/2015 | Matsui et al. | |
| 2018/0120175 A1 | 5/2018 | Yoneda et al. | |

FOREIGN PATENT DOCUMENTS

| | | |
|---|---|---|
| JP | 2016-057115 A | 4/2016 |
| JP | 2016-206091 A | 12/2016 |

OTHER PUBLICATIONS

The International Preliminary Report on Patentability for PCT/JP2018/034638 dated Jul. 17, 2019 [PCT/IPEA/409].

* cited by examiner

TORQUE SENSOR AND STEERING DEVICE

CROSS-REFERENCE TO RELATED APPLICATION

This application is a National Stage of PCT international application Ser. No. PCT/JP2018/034638 filed on Sep. 19, 2018, which designates the United States, incorporated herein by reference, and which is based upon and claims the benefit of priority from Japanese Patent Application No. 2017-180412 filed on Sep. 20, 2017, the entire contents of which are incorporated herein by reference.

BACKGROUND

1. Technical Field

The present invention relates to a torque sensor and a steering device.

2. Description of the Related Art

An electric power steering device installed in a vehicle includes a torque sensor for detecting steering torque. The torque sensor changes output based on relative rotation of input and output shafts coupled to each other via a torsion bar. An electronic control unit (ECU) controls a motor based on information acquired from the torque sensor, and torque generated by the motor assists steering. For example, Prior Art 1 describes an example of the torque sensor. According to the technique described in Prior Art 1, it is possible to detect a position error in assembling.

Prior Art 1: Japanese Laid-open Patent Publication No. 2016-57115

Output of a torque sensor using a magnet and a yoke changes based on relative positions of the magnet and the yoke. Although the torque sensor is basically designed based on a sufficient safety factor, there is a possibility that the position of the magnet or yoke of the torque sensor deviates in a shaft direction due to vibration, impact, or the like that is applied to a vehicle. When the magnet and the yoke relatively move in the shaft direction, an error occurs in the output of the torque sensor. Therefore, a torque sensor that prevents a reduction in detection accuracy has been demanded.

The present invention has been made in view of the foregoing problem, and aims to provide a torque sensor that can prevent a reduction in detection accuracy.

SUMMARY

According to an aspect of the present disclosure in order to achieve the above-mentioned purpose, a torque sensor includes a sensor housing, a first sleeve attached to a first rotating member that rotates with respect to the sensor housing, a magnet attached to the first sleeve, a second sleeve attached to a second rotating member coupled to the first rotating member via a torsion bar, a carrier attached to the second sleeve, a yoke attached to the carrier and opposing the magnet in a radial direction orthogonal to a shaft direction that is a longitudinal direction of the first rotating member, and a magnetic flux collecting member attached to the sensor housing and opposing the yoke in the shaft direction. The carrier opposes an opposing end surface of either one of the first sleeve and the magnet in the shaft direction. A length of a gap between the carrier and the opposing end surface in the shaft direction is smaller than a length of a gap between the yoke and the magnetic flux collecting member in the shaft direction.

Although a torque sensor is basically designed based on a sufficient safety factor, there is a possibility that a magnet deviates together with a first sleeve with respect to a first rotating member in a shaft direction due to vibration, impact, or the like that is applied to the torque sensor. Alternatively, there is a possibility that a yoke deviates together with a second sleeve and a carrier with respect to a second rotating member in the shaft direction. By contrast, in the torque sensor according to the present disclosure, even when the first sleeve moves with respect to the first rotating member, the opposing end surface hits against the carrier so that deviation of the magnet is more likely to be equal to or lower than an acceptable value. Further, even when the second sleeve and the carrier move with respect to the second rotating member, the carrier hits against the opposing end surface so that deviation of the yoke is more likely to be equal to or lower than an acceptable value. Furthermore, before the yoke hits against the magnetic flux collecting member, the carrier hits against the opposing end surface. This prevents breakage or abrasion of the yoke and the magnetic flux collecting member, which significantly affect detection accuracy. In this manner, the torque sensor has robustness. Therefore, even when the magnet or the yoke moves, the torque sensor has a fail-safe mechanism that can prevent a reduction in the detection accuracy.

As a preferable aspect of the torque sensor, the carrier includes a protrusion opposing the opposing end surface in the shaft direction.

With this configuration, the adjustment of a length of the gap between the carrier and the opposing end surface in the shaft direction is made easier.

As a preferable aspect of the torque sensor, the carrier is made of resin.

With this configuration, the formation of the protrusion is made easier. In addition, even when the carrier and the first sleeve contact with each other, an abnormal sound hardly occurs and resistance caused by friction between the carrier and the first sleeve is prevented.

As a preferable aspect of the torque sensor, the carrier includes a plurality of the protrusions, and the protrusions are arranged along a circumference about a rotational axis of the first rotating member.

With this configuration, even when the carrier and the first sleeve contact with each other, load applied to the protrusion is dispersed and breakage or abrasion of the protrusion is prevented.

As a preferable aspect of the torque sensor, the first sleeve includes a first small-diameter portion in contact with the first rotating member, and a first large-diameter portion that deviates in position with respect to the first small-diameter portion in the shaft direction and has an outer diameter larger than an outer diameter of the first small-diameter portion, and the first large-diameter portion holds the magnet.

With this configuration, when the first sleeve is pressed into the first rotating member, the deformation of the first large-diameter portion holding the magnet is prevented. This makes a distance between the magnet and the yoke unlikely to deviate from a design value. Therefore, a reduction in the detection accuracy of the torque sensor is further prevented.

As a preferable aspect of the torque sensor, the carrier includes a second small-diameter portion in contact with the second sleeve, and a second large-diameter portion that deviates in position with respect to the second small-diameter portion in the shaft direction and has an outer diameter larger than an outer diameter of the second small-diameter portion, and the second large-diameter portion holds the yoke.

With this configuration, when the second sleeve is pressed into the second rotating member, the deformation of the second large-diameter portion holding the yoke is prevented. This makes the distance between the magnet and the yoke unlikely to deviate from the design value. Therefore, a reduction in the detection accuracy of the torque sensor is further prevented.

According to another aspect of the present disclosure, a steering device includes the torque sensor described above.

With this configuration, the steering device can prevent a reduction in the accuracy of auxiliary steering torque generated by an electric motor. The steering device can appropriately assist steering.

According to the present disclosure, a torque sensor that can prevent a reduction in detection accuracy can be provided.

DETAILED DESCRIPTION

Hereinafter, the present invention is described in detail with reference to the drawings. Modes (hereinafter referred to as embodiments) for carrying out the present invention are not indented to limit the present invention. Constituent elements described in the following embodiment include an element that is easily conceivable by those skilled in the art, an element that is substantially identical thereto, and an element within a range of equivalents. Furthermore, the constituent elements disclosed in the following embodiment can be combined as appropriate.

Embodiment

Figure 1:
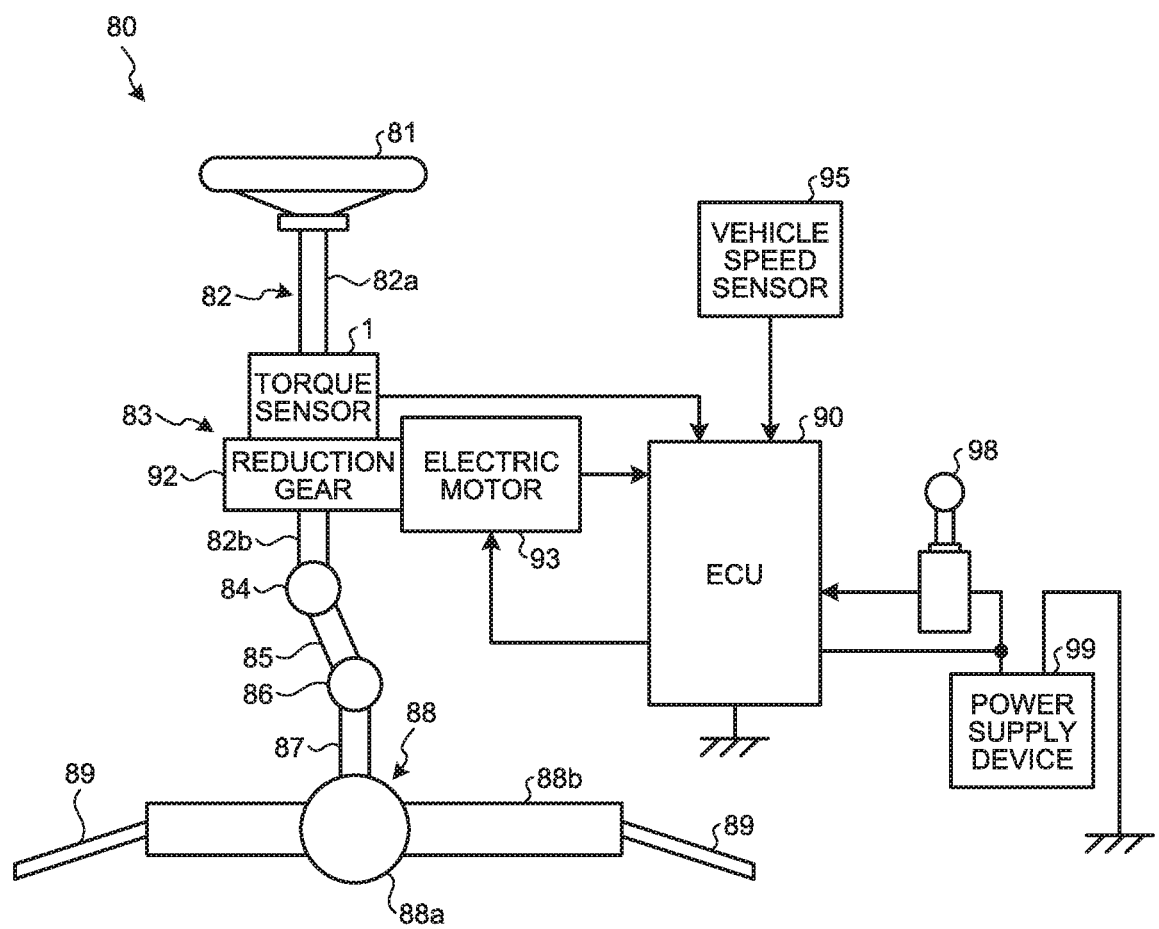
FIG. 1 is a schematic diagram illustrating a steering device according to an embodiment.
Figure 2:
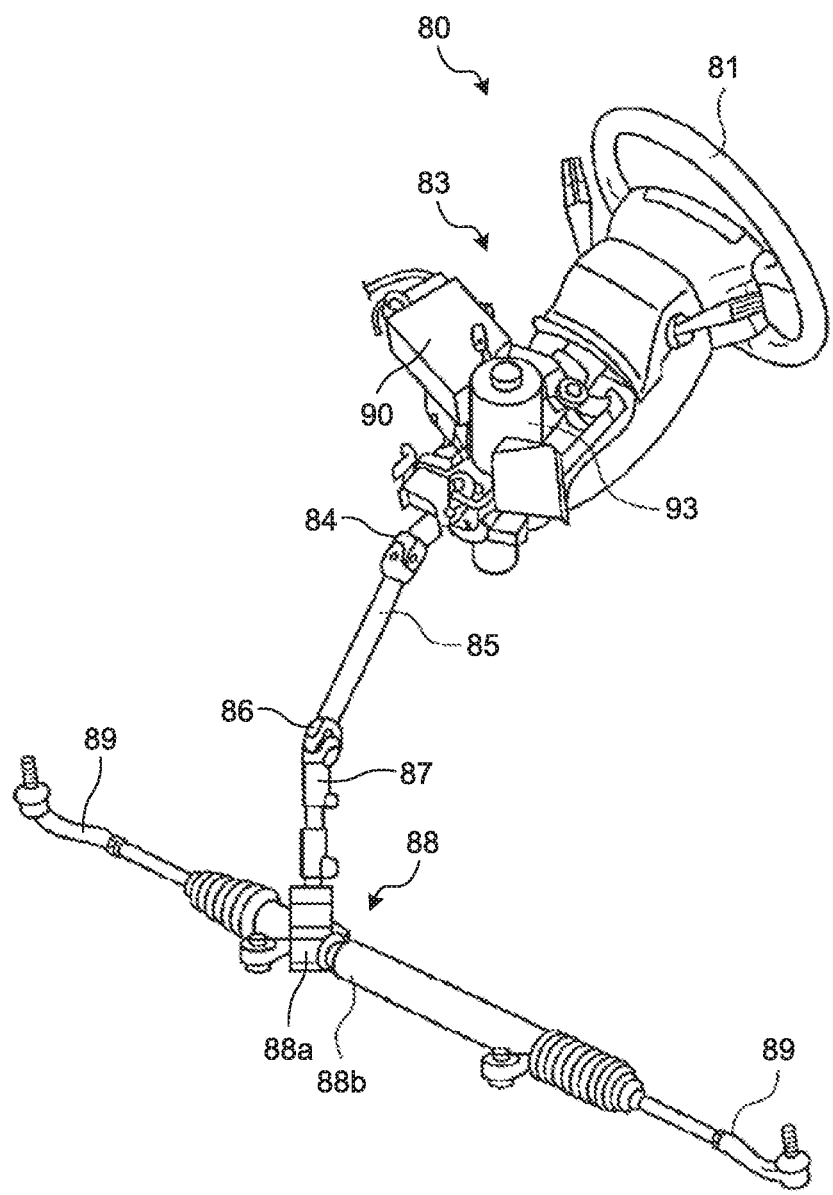
FIG. 2 is a perspective view illustrating the steering device according to the present embodiment.
Figure 3:
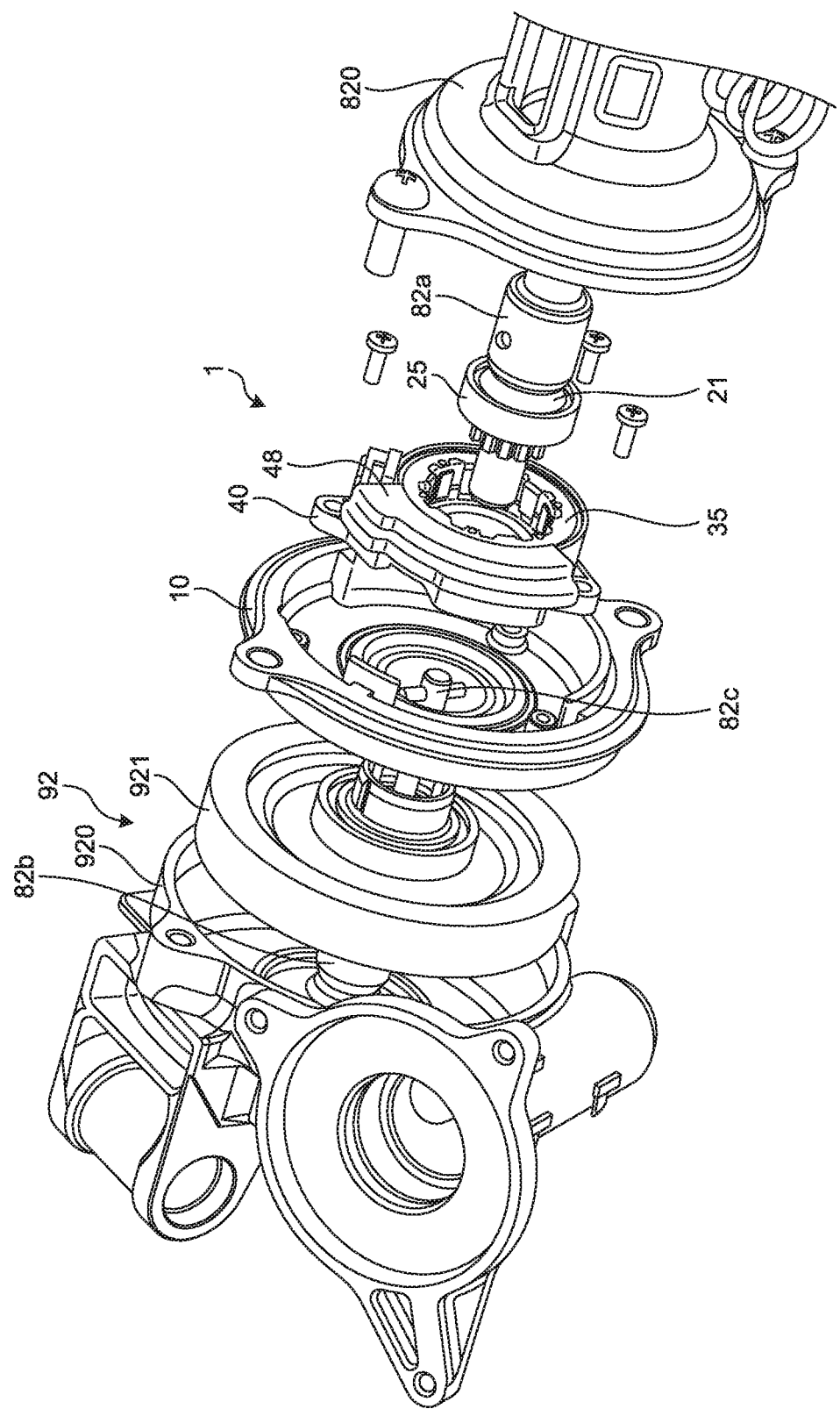
FIG. 3 is an exploded perspective view illustrating the steering device according to the present embodiment.
Figure 4:
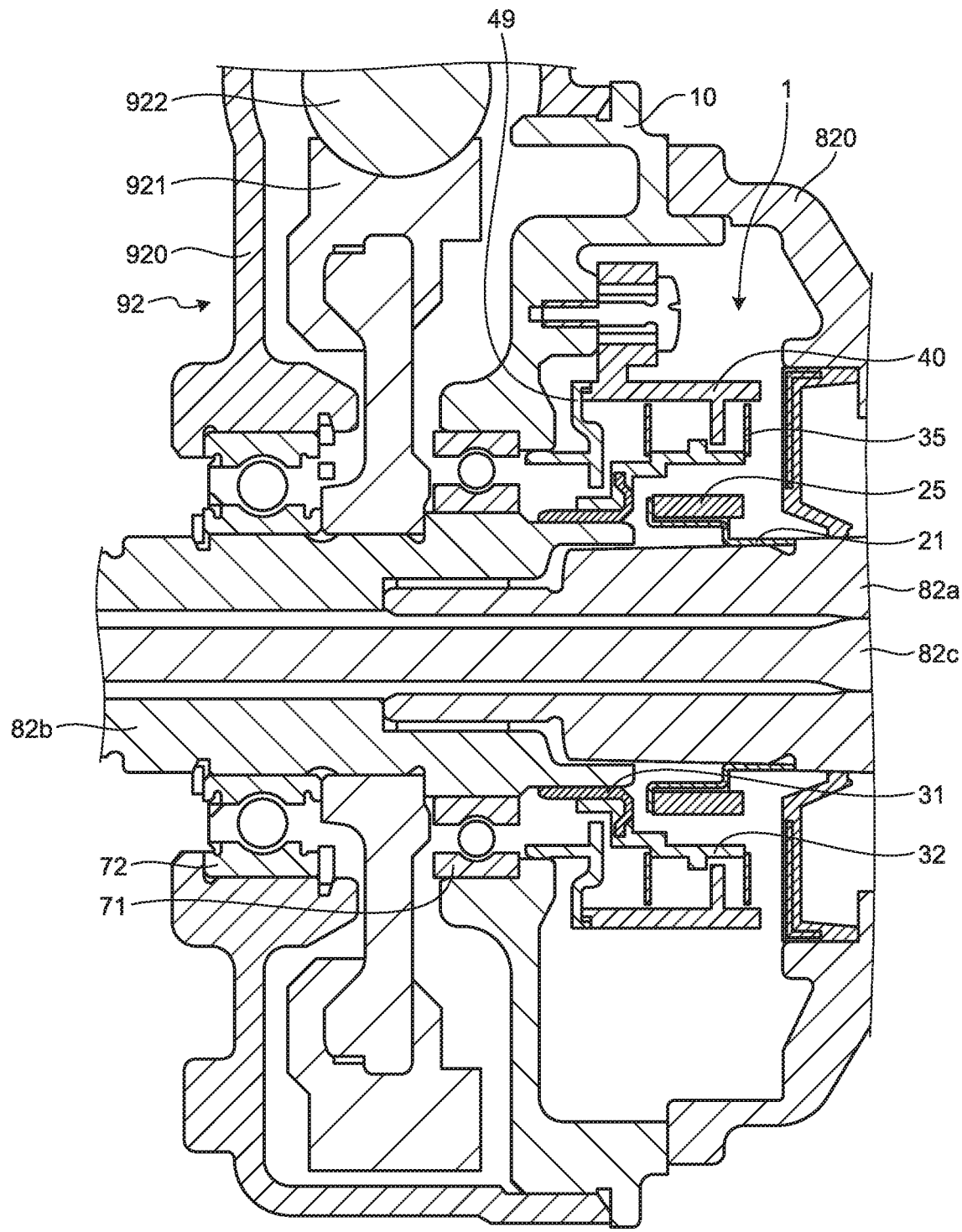
FIG. 4 is a cross-sectional view illustrating the steering device according to the present embodiment.

FIG. 1 is a schematic diagram illustrating a steering device according to the present embodiment. FIG. 2 is a perspective view illustrating the steering device according to the present embodiment. FIG. 3 is an exploded perspective view illustrating the steering device according to the present embodiment. FIG. 4 is a cross-sectional view illustrating the steering device according to the present embodiment.

As illustrated in FIG. 1, a steering device 80 includes a steering wheel 81, a steering shaft 82, a steering force assist mechanism 83, a universal joint 84, an intermediate shaft 85, and a universal joint 86, which are arranged in the order in which force applied from an operator is transferred. The steering device 80 is joined to a pinion shaft 87. In the following description, a front side of a vehicle in which the steering device 80 is installed is simply referred to as a front side, and a rear side of the vehicle is simply referred to as a rear side. In addition, as illustrated in FIG. 3, the steering device 80 includes a gearbox 920, an intermediate plate 10, and a column housing 820. The gearbox 920 is attached to the vehicle. The column housing 820 is fixed to the gearbox 920 via the intermediate plate 10.

As illustrated in FIGS. 1 and 4, the steering shaft 82 includes an input shaft 82a, an output shaft 82b, and a torsion bar 82c. The input shaft 82a is held by the column housing 820 illustrated in FIG. 4 via a bearing. The input shaft 82a can rotate with respect to the column housing 820. One end of the input shaft 82a is coupled to the steering wheel 81. The other end of the input shaft 82a is coupled to the torsion bar 82c. The torsion bar 82c is fitted in a hole formed at the center of the input shaft 82a and is fixed to the input shaft 82a via a pin. In the following description, a direction parallel to a longitudinal direction of the input shaft 82a is referred to as a shaft direction, and a direction orthogonal to the shaft direction is referred to as a radial direction. A direction extending along a circumference about a rotational axis of the input shaft 82a is referred to as a circumferential direction.

As illustrated in FIG. 4, the output shaft 82b is held by the intermediate plate 10 via a bearing 71 and held by the gearbox 920 via a bearing 72. For example, the bearing 71 is pressed into the intermediate plate 10 and the bearing 72 is pressed into the gearbox 920. The output shaft 82b can rotate with respect to the intermediate plate 10 and the gearbox 920. One end of the output shaft 82b is coupled to the torsion bar 82c. The other end of the output shaft 82b is coupled to the universal joint 84. The torsion bar 82c is pressed into a hole formed at the center of the output shaft 82b and is fixed to the output shaft 82b.

A front end of the input shaft 82a is located on the inner side of the output shaft 82b. A protrusion formed on one of an outer circumferential surface of the input shaft 82a and an inner circumferential surface of the output shaft 82b is fitted in a recess formed on the other of the outer circumferential surface of the input shaft 82a and the inner circumferential surface of the output shaft 82b. There is a gap between the protrusion and the recess in the circumferential direction. With this configuration, even when the torsion bar 82c does not function as a coupling member, torque is transferred between the input shaft 82a and the output shaft 82b.

As illustrated in FIG. 1, the intermediate shaft 85 couples the universal joint 84 and the universal joint 86. One end of the intermediate shaft 85 is coupled to the universal joint 84, and the other end of the intermediate shaft 85 is coupled to the universal joint 86. One end of the pinion shaft 87 is coupled to the universal joint 86, and the other end of the pinion shaft 87 is coupled to a steering gear 88. The universal joint 84 and the universal joint 86 are, for example, Cardan joints. Rotation of the steering shaft 82 is transferred to the pinion shaft 87 via the intermediate shaft 85. In other words, the intermediate shaft 85 rotates together with the steering shaft 82.

As illustrated in FIG. 1, the steering gear 88 includes a pinion 88a and a rack 88b. The pinion 88a is coupled to the pinion shaft 87. The rack 88b is engaged with the pinion 88a. The steering gear 88 converts rotational motion transferred to the pinion 88a into linear motion in the rack 88b. The rack 88b is coupled to a tie rod 89. Angles of wheels are changed by movement of the rack 88b.

As illustrated in FIG. 1, the steering force assist mechanism 83 includes a reduction gear 92 and an electric motor 93. The reduction gear 92 is, for example, a worm reduction gear and includes a gearbox 920, a worm wheel 921, and a worm 922, as illustrated in FIGS. 3 and 4. Torque generated by the electric motor 93 is transferred to the worm wheel 921 via the worm 922 and causes the worm wheel 921 to rotate. The worm 922 and the worm wheel 921 increase torque generated by the electric motor 93. The worm wheel 921 is fixed to the output shaft 82b. For example, the worm wheel 921 is pressed into the output shaft 82b. Thus, the reduction gear 92 gives auxiliary steering torque to the output shaft 82b. The steering device 80 is a column assist electric power steering device.

As illustrated in FIG. 1, the steering device 80 includes an electronic control unit (ECU) 90, a torque sensor 1, and a vehicle speed sensor 95. The electric motor 93, the torque sensor 1, and the vehicle speed sensor 95 are electrically connected to the ECU 90. The torque sensor 1 outputs steering torque transferred to the input shaft 82a to the ECU 90 via controller area network (CAN) communication. The vehicle speed sensor 95 detects a traveling speed (vehicle speed) of a vehicle body in which the steering device 80 is installed. The vehicle speed sensor 95 is attached to the vehicle body and outputs a vehicle speed to the ECU 90 via the CAN communication.

The ECU 90 controls an operation of the electric motor 93. The ECU 90 acquires signals from the torque sensor 1 and the vehicle speed sensor 95. In a state in which an ignition switch 98 is turned on, power is supplied from a power supply device 99 (for example, an in-vehicle battery) to the ECU 90. The ECU 90 calculates an auxiliary steering instruction value based on the steering torque and the vehicle speed. The ECU 90 adjusts a value of power to be supplied to the electric motor 93 based on the auxiliary steering instruction value. The ECU 90 acquires information of an induced voltage of the electric motor 93 or information output from a resolver installed in the electric motor 93 or the like. The ECU 90 controls the electric motor 93 to reduce force necessary for an operation of the steering wheel 81.

Figure 5:
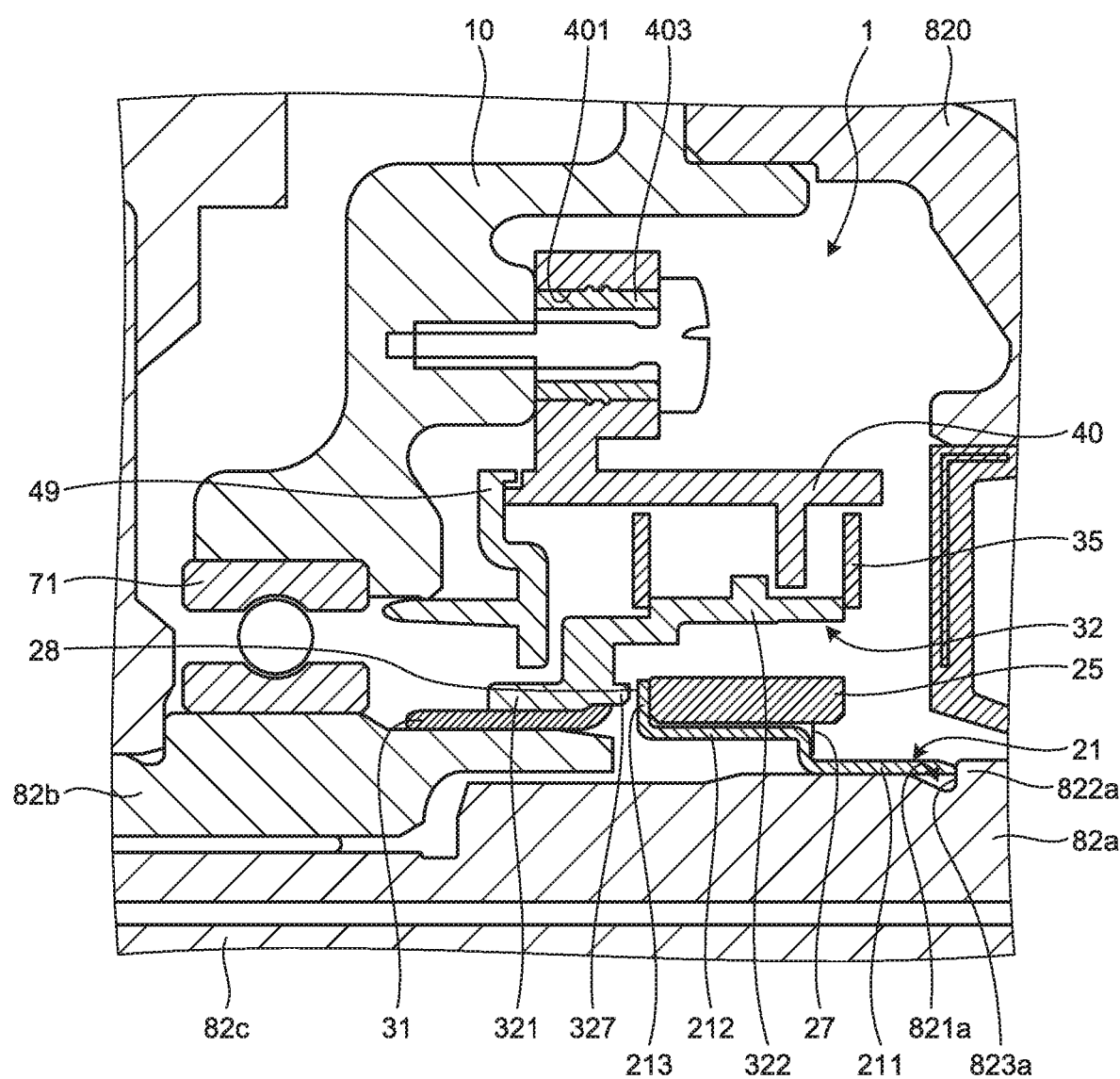
FIG. 5 is an enlarged view illustrating part of FIG. 4.
Figure 6:
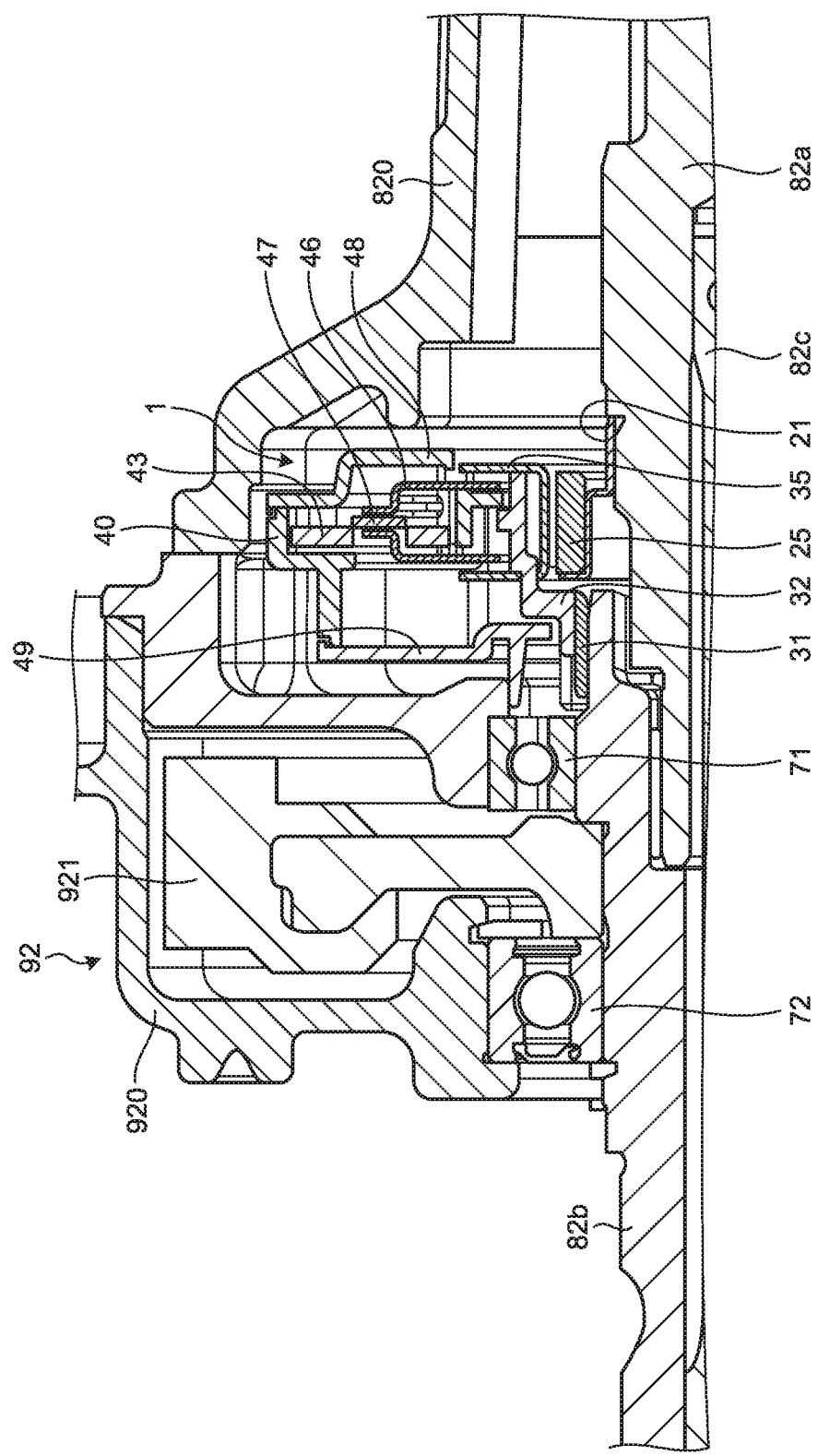
FIG. 6 is a cross-sectional view illustrating the steering device according to the present embodiment, taken along a plane different from that in FIG. 4.
Figure 7:
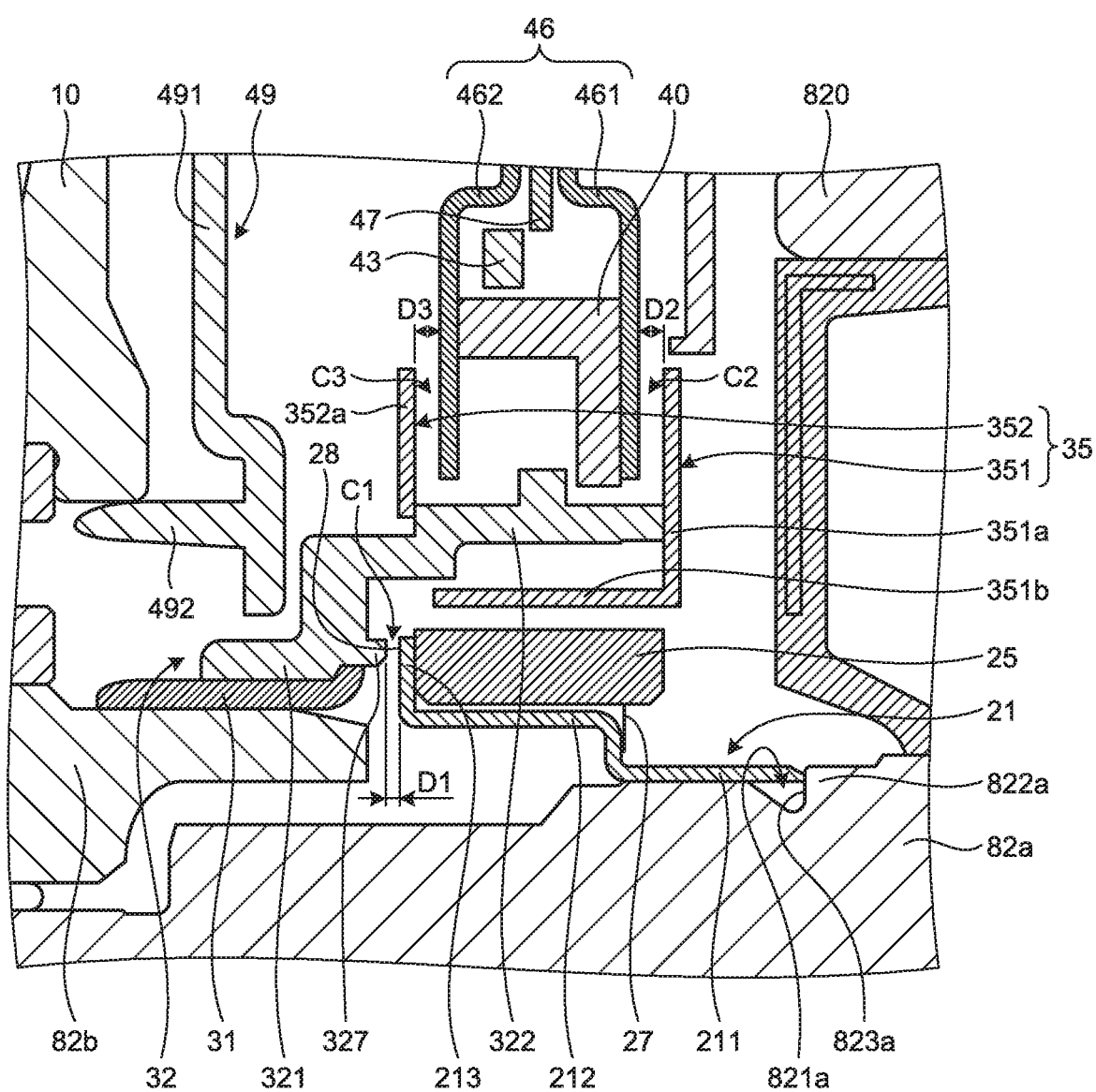
FIG. 7 is an enlarged view illustrating part of FIG. 6.
Figure 8:
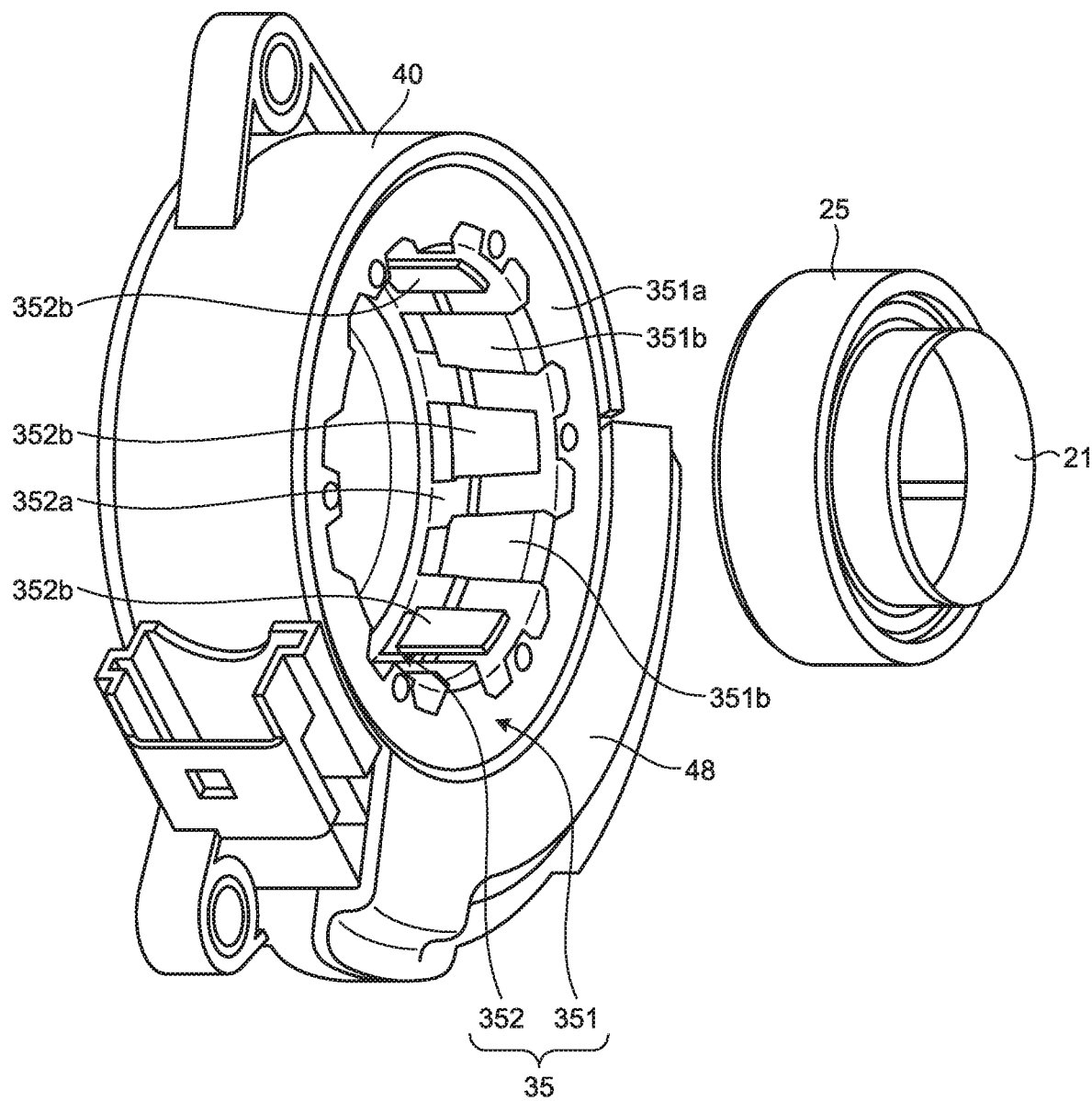
FIG. 8 is an exploded perspective view illustrating a magnet, a yoke, and the like according to the present embodiment.
Figure 9:
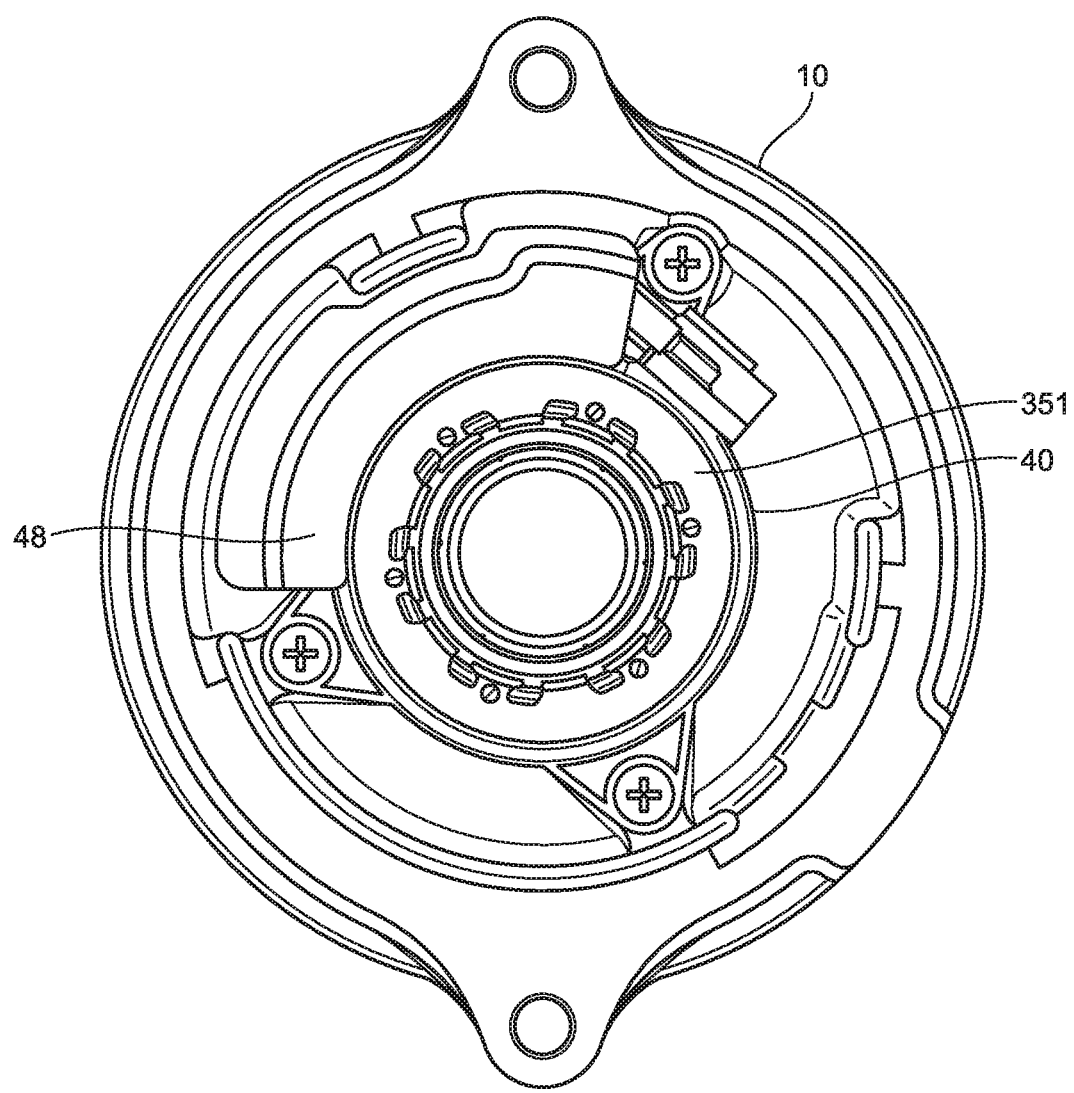
FIG. 9 is a front view illustrating a steering housing, a sensor housing, and the like according to the present embodiment.
Figure 10:
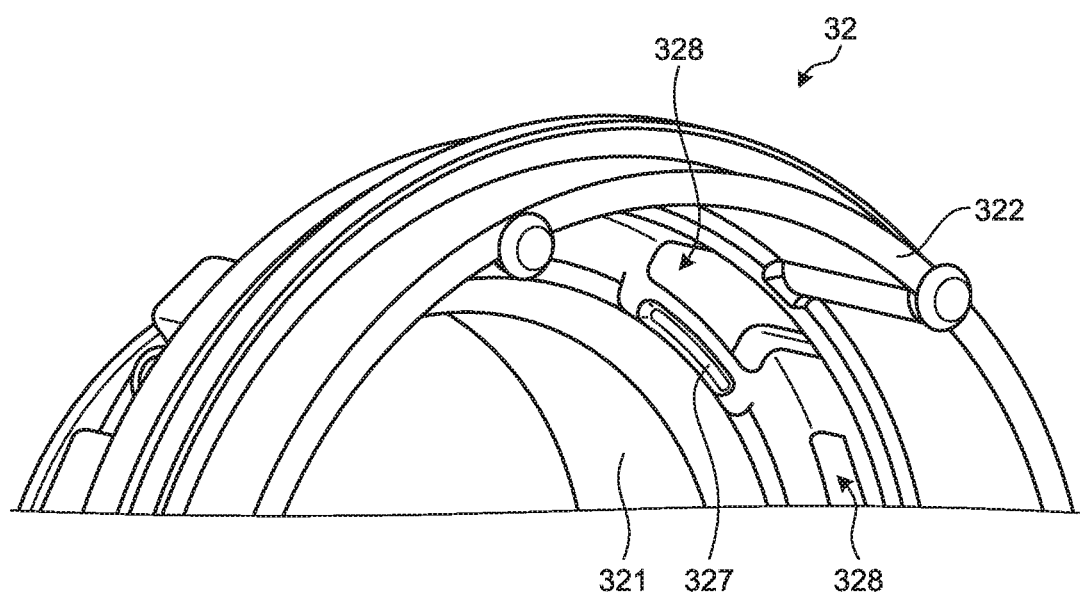
FIG. 10 is a perspective view illustrating part of a carrier according to the present embodiment.
Figure 11:
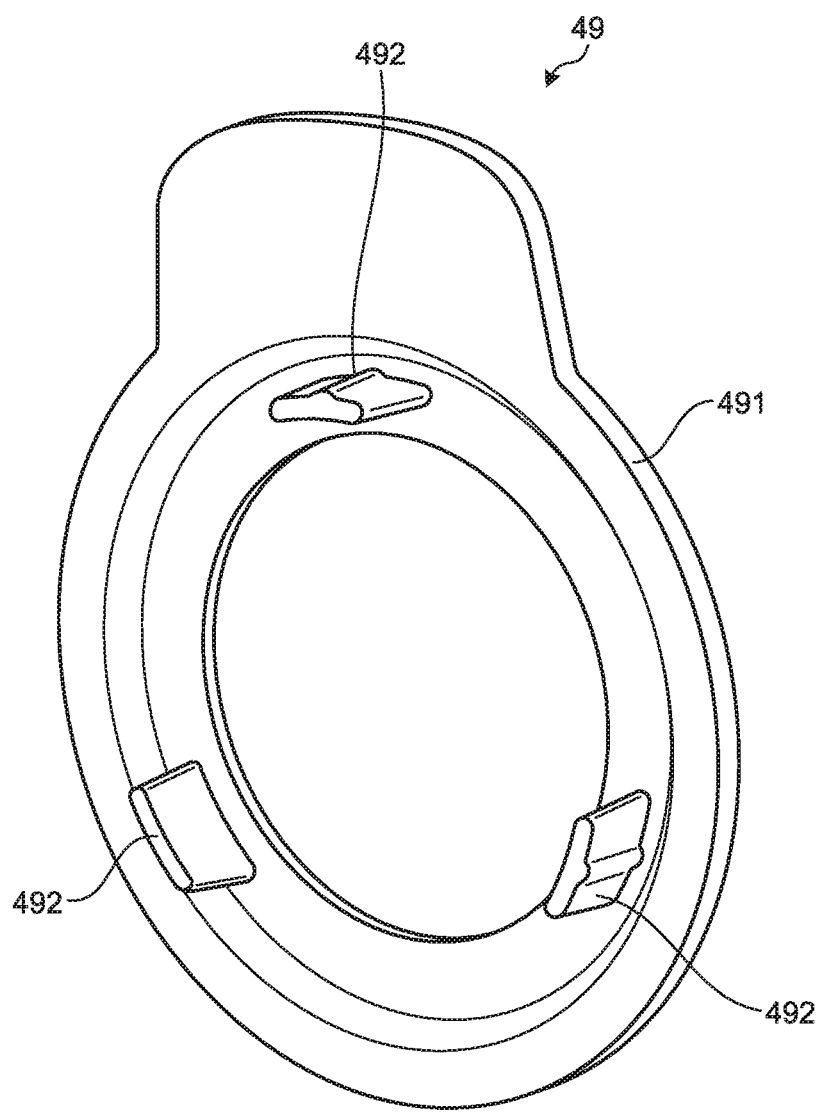
FIG. 11 is a perspective view illustrating a cover according to the present embodiment.

FIG. 5 is an enlarged view illustrating part of FIG. 4. FIG. 6 is a cross-sectional view illustrating the steering device according to the present embodiment, taken along a plane different from that in FIG. 4. FIG. 7 is an enlarged view illustrating part of FIG. 6. FIG. 8 is an exploded perspective view illustrating a magnet, a yoke, and like according to the present embodiment. FIG. 9 is a front view illustrating a steering housing, a sensor housing, and the like according to the present embodiment. FIG. 10 is a perspective view illustrating part of a carrier according to the present embodiment. FIG. 11 is a perspective view illustrating a cover according to the present embodiment.

As illustrated in FIG. 4, the torque sensor 1 is installed between the column housing 820 and the gearbox 920. Specifically, the torque sensor 1 is located in a space between the column housing 820 and the intermediate plate 10. As illustrated in FIGS. 4 to 7, the torque sensor 1 includes a first sleeve 21, a magnet 25, a second sleeve 31, a carrier 32, a yoke 35, a sensor housing 40, a magnetic flux collecting member 46, a printed board 43, a hall IC 47, a first cover 48, and a second cover 49.

The first sleeve 21 is a non-magnetic body and is made of metal. A specific example of the metal of the non-magnetic body is austenitic stainless steel (SUS304). As illustrated in FIG. 5, the first sleeve 21 is a cylindrical member and is attached to the input shaft 82a. The first sleeve 21 includes a first small-diameter portion 211, a first large-diameter portion 212, and a flange portion 213. The first small-diameter portion 211 is a cylindrical member and is pressed into the outer circumferential surface of the input shaft 82a. A rear end surface of the first small-diameter portion 211 is in contact with an end surface 823a of a raised portion 822a of the input shaft 82a. This positions the first sleeve 21 and restricts movement of the first sleeve 21 toward the rear side. An annular groove 821a is formed in part of the input shaft 82a corresponding to a rear end of the first small-diameter portion 211. The first large-diameter portion 212 is a cylindrical member. An outer diameter of the first large-diameter portion 212 is larger than an outer diameter of the first small-diameter portion 211. The first large-diameter portion 212 is located on the front side of the first small-diameter portion 211. A rear end of the first large-diameter portion 212 is coupled to a front end of the first small-diameter portion 211. The flange portion 213 is a disk-shaped member protruding from a front end of the first large-diameter portion 212 toward an outer side in the radial direction. The flange portion 213 is a plate orthogonal to the shaft direction. The flange portion 213 has an opposing end surface 28 opposing the carrier 32.

The magnet 25 is a hard magnetic body. A specific example of the hard-magnetic body is neodymium or ferrite. The magnet 25 is cylindrically formed of neodymium and polyamide 12 or of ferrite and polyamide 6. In the magnet 25, the south (S) pole and the north (N) pole are alternately arranged in the circumferential direction. The magnet 25 is attached to the first sleeve 21. Specifically, the magnet 25 is installed on the outer side of the first large-diameter portion 212 in the radial direction. An adhesive 27 is filled in a gap between an inner circumferential surface of the magnet 25 and an outer circumferential surface of the first large-diameter portion 212. The magnet 25 is fixed to the first large-diameter portion 212 with the adhesive 27. For example, the adhesive 27 is an epoxy-based adhesive. A front end of the magnet 25 is in contact with the flange portion 213. The magnet 25 rotates together with the input shaft 82a and the first sleeve 21.

The second sleeve 31 is a non-magnetic body and is made of metal. A specific example of the metal of the non-magnetic body is austenitic stainless steel (SUS304). As illustrated in FIG. 5, the second sleeve 31 is a cylindrical member and is attached to the output shaft 82b. Specifically, the second sleeve 31 is pressed into an outer circumferential surface of the output shaft 82b. A front end surface of the second sleeve 31 is not in contact with the output shaft 82b. Specifically, there is a gap between the front end surface of the second sleeve 31 and the output shaft 82b in the shaft direction. The position of a rear end surface of the second sleeve 31 in the shaft direction is the same as the position of a rear end surface of the output shaft 82b in the shaft direction. The second sleeve 31 is positioned by aligning the rear end surface of the second sleeve 31 with the rear end surface of the output shaft 82b.

The carrier 32 is a non-magnetic body. For example, the carrier 32 is made of resin. A specific example of the resin is polybutylene terephthalate (PBT) or polyacetal resin (POM). The carrier 32 is a cylindrical member and is attached to the output shaft 82b via the second sleeve 31. As illustrated in FIGS. 5 and 10, the carrier 32 includes a second small-diameter portion 321, a second large-diameter portion 322, a protrusion 327, and a plurality of holes 328. As illustrated in FIG. 5, the carrier 32 is molded by injection and formed integrally with the second sleeve 31. The second small-diameter portion 321 is a cylindrical member and is in contact with an outer circumferential surface of the second sleeve 31. A rear end surface of the second small-diameter portion 321 opposes the flange portion 213 of the first sleeve 21. The second large-diameter portion 322 is a cylindrical member. An outer diameter of the second large-diameter portion 322 is larger than an outer diameter of the second small-diameter portion 321. The second large-diameter portion 322 is located on the rear side of the second small-diameter portion 321. A front end of the second large-diameter portion 322 is coupled to a rear end of the second small-diameter portion 321. The protrusion 327 protrudes from the rear end surface of the second small-diameter portion 321 toward the rear side and opposes the opposing end surface 28 of the flange portion 213. There is a gap C1 between the protrusion 327 and the opposing end surface 28. As illustrated in FIG. 10, the holes 328 penetrate in the shaft direction. The holes 328 are arranged at equal intervals in the circumferential direction.

As illustrated in FIG. 8, the yoke 35 includes a first yoke 351 and a second yoke 352. The first yoke 351 and the second yoke 352 each have a soft-magnetic body. A specific example of the soft-magnetic body is a nickel-iron alloy. The first yoke 351 and the second yoke 352 are fixed to the carrier 32. The first yoke 351 and the second yoke 352 rotate together with the output shaft 82b, the second sleeve 31, and the carrier 32. The first yoke 351 includes a first ring portion 351a and a plurality of first teeth 351b. The first ring portion 351a is a plate orthogonal to the shaft direction. The first teeth 351b protrude from the first ring portion 351a toward the front side. The first teeth 351b are arranged at equal intervals in the circumferential direction. The second yoke 352 includes a second ring portion 352a and a plurality of second teeth 352b. The second ring portion 352a is a plate parallel to the first ring portion 351a and located on the front side of the first ring portion 351a. The second teeth 352b protrude from the second ring portion 352a toward the rear side. The second teeth 352b penetrate the respective holes 328 of the carrier 32 that are illustrated in FIG. 10. The second teeth 352b are arranged at equal intervals in the circumferential direction. A single second tooth 352b is located between two first teeth 351b. Specifically, the first tooth 351b and the second tooth 352b are alternately arranged in the circumferential direction. The first teeth 351b and the second teeth 352b oppose the magnet 25.

The sensor housing 40 is a non-magnetic body. For example, the sensor housing 40 is made of resin. A specific example of the resin is polybutylene terephthalate (PBT) or polyamide 66. As illustrated in FIG. 5, a bush 403 is installed in a hole 401 of the sensor housing 40. For example, the bush 403 is made of an aluminum alloy and is formed integrally with the sensor housing 40. The sensor housing 40 is fixed to the intermediate plate 10 with a bolt penetrating the bush 403.

As illustrated in FIG. 7, the magnetic flux collecting member 46 includes a first magnetic flux collecting member 461 and a second magnetic flux collecting member 462. Each of the first magnetic flux collecting member 461 and the second magnetic flux collecting member 462 has a soft-magnetic body, and is made of, for example, a nickel-iron alloy. The first magnetic flux collecting member 461 and the second magnetic flux collecting member 462 are fixed to the sensor housing 40. As illustrated in FIG. 7, the first magnetic flux collecting member 461 opposes the first ring portion 351a. There is a gap C2 between the first magnetic flux collecting member 461 and the first ring portion 351a. The first magnetic flux collecting member 461 is magnetized according to the magnetization of the first yoke 351. The second magnetic flux collecting member 462 opposes the second ring portion 352a. There is a gap C3 between the second magnetic flux collecting member 462 and the second ring portion 352a. The second magnetic flux collecting member 462 is magnetized according to the magnetization of the second yoke 352. For example, a length D3 of the gap C3 in the shaft direction is nearly equal to a length D2 of the gap C2 in the shaft direction. A length D1 of the above-mentioned gap C1 in the shaft direction is smaller than the length D2 and the length D3. In the present embodiment, the length D1 is, for example, 0.79 mm.

The printed board 43 is fixed to the sensor housing 40. The hall IC 47 is attached to the printed board 43. The hall IC 47 is installed between the first magnetic flux collecting member 461 and the second magnetic flux collecting member 462. There is a gap between the hall IC 47 and the first magnetic flux collecting member 461. There is a gap between the hall IC 47 and the second magnetic flux collecting member 462. The hall IC 47 changes a signal to be output in accordance with a change in a magnetic flux density between the first magnetic flux collecting member 461 and the second magnetic flux collecting member 462. The hall IC 47 outputs the signal to the ECU 90.

When the steering wheel 81 is operated, torque is transferred to the input shaft 82a. Since the output shaft 82b is coupled to the input shaft 82a via the torsion bar 82c, the input shaft 82a rotates relative to the output shaft 82b. Thus, the magnet 25 rotates relative to the first teeth 351b and the second teeth 352b. This relative rotation changes respective intensities of magnetization of the first yoke 351 and the second yoke 352. Accordingly, the magnetic flux density between the first magnetic flux collecting member 461 and the second magnetic flux collecting member 462 changes. The hall IC 47 detects the change in the magnetic flux density. The ECU 90 controls the electric motor 93 using steering torque calculated based on the signal output from the hall IC 47.

The first cover 48 is a non-magnetic body. For example, the first cover 48 is resin. A specific example of the resin is polybutylene terephthalate (PBT) or polyamide 66. As illustrated in FIG. 6, the first cover 48 is attached to a rear end of the sensor housing 40. The first cover 48 covers the printed board 43.

The second cover 49 is a non-magnetic body. For example, the second cover 49 is made of resin. A specific example of the resin is polybutylene terephthalate (PBT) or polyamide 66. As illustrated in FIG. 6, the second cover 49 is attached to a front end of the sensor housing 40. As illustrated in FIG. 11, the second cover 49 includes an annular body portion 491 and a plurality of claw portions 492. The claw portions 492 are arranged at equal intervals in the circumferential direction. As illustrated in FIG. 7, the claw portions 492 protrude from the body portion 491 toward the front side. The claw portions 492 are inserted in the intermediate plate 10 by light press fitting and are in contact with an inner circumferential surface of the intermediate plate 10. Thus, the center of the sensor housing 40 when viewed from the shaft direction easily matches with the center of the intermediate plate 10.

The first sleeve 21 does not necessarily have the opposing end surface 28, and the magnet 25 may have the opposing end surface 28. Specifically, the front end of the magnet 25 may oppose, without being covered with the first sleeve 21, the carrier 32. The opposing end surface 28 only needs to be arranged in either one of the first sleeve 21 and the magnet 25.

The carrier 32 does not necessarily have the protrusion 327. Without the protrusion 327, a length of a gap between the second small-diameter portion 321 of the carrier 32 and the flange portion 213 of the first sleeve 21 in the shaft direction only needs to be smaller than the lengths D2 and D3 illustrated in FIG. 7. The carrier 32 may include a plurality of the protrusions 327. The protrusions 327 are preferably arranged at equal intervals in the circumferential direction.

The lengths D2 and D3 illustrated in FIG. 7 are not necessarily equal to each other. When the lengths D2 and D3 are not equal to each other, the length D1 only needs to be smaller than a smaller one of the lengths D2 and D3.

As illustrated in FIG. 7, while the front end surface of the second sleeve 31 is not in contact with the output shaft 82b, the output shaft 82b may have a portion opposing the front end surface of the second sleeve 31. The portion is, for example, an end surface of a raised portion formed on the outer circumferential surface of the output shaft 82b. In this case, it is preferable that a length of a gap between the second sleeve 31 and the portion in the shaft direction be smaller than the lengths D2 and D3 illustrated in FIG. 7. This configuration prevents contact between the yoke 35 and the magnetic flux collecting member 46 even when the yoke 35 moves together with the carrier 32 and the second sleeve 31 toward the front side.

As described above, the torque sensor 1 includes the sensor housing 40, the first sleeve 21, the magnet 25, the second sleeve 31, the carrier 32, the yoke 35, and the magnetic flux collecting member 46. The first sleeve 21 is attached to the first rotating member (input shaft 82a) that rotates with respect to the sensor housing 40. The magnet 25 is attached to the first sleeve 21. The second sleeve 31 is attached to the second rotating member (output shaft 82b) coupled to the first rotating member via the torsion bar 82c. The carrier 32 is attached to the second sleeve 31. The yoke 35 is attached to the carrier 32 and opposes the magnet 25 in the radial direction orthogonal to the shaft direction that is the longitudinal direction of the first rotating member. The magnetic flux collecting member 46 is attached to the sensor housing 40 and opposes the yoke 35 in the shaft direction. The carrier 32 opposes the opposing end surface 28 of either one of the first sleeve 21 and the magnet 25 in the shaft direction. The length D1 of the gap C1 between the carrier 32 and the opposing end surface 28 in the shaft direction is smaller than a length (length D2 or D3) of a gap (gap C2 or gap C3) between the yoke 35 and the magnetic flux collecting member 46 in the shaft direction.

Although the torque sensor 1 is basically designed based on a sufficient safety factor, there is a possibility that the magnet 25 deviates together with the first sleeve 21 with respect to the first rotating member (input shaft 82a) in the shaft direction due to vibration, impact, or the like applied to the torque sensor 1. Alternatively, there is a possibility that the yoke 35 deviates together with the second sleeve 31 and the carrier 32 with respect to the second rotating member (output shaft 82b) in the shaft direction. By contrast, in the torque sensor 1 according to the present embodiment, even when the first sleeve 21 moves with respect to the first rotating member, the opposing end surface 28 hits against the carrier 32 so that deviation of the magnet 25 is more likely to be equal to or lower than an acceptable value. Further, even when the second sleeve 31 and the carrier 32 move with respect to the second rotating member, the carrier 32 hits against the opposing end surface 28 so that deviation of the yoke 35 is more likely to be equal to or lower than an acceptable value. Furthermore, before the yoke 35 hits against the magnetic flux collecting member 46, the carrier 32 hits against the opposing end surface 28. This prevents breakage or abrasion of the yoke 35 and the magnetic flux collecting member 46, which significantly affect detection accuracy. In this manner, the torque sensor 1 has robustness. The torque sensor 1 can thus prevent a reduction in the detection accuracy.

Further, in the torque sensor 1, the carrier 32 has the protrusion 327 opposing the opposing end surface 28 in the shaft direction.

Therefore, the adjustment of the length D1 of the gap C1 between the carrier 32 and the opposing end surface 28 in the shaft direction is easy.

Further, in the torque sensor 1, the carrier 32 is made of resin.

Consequently, the formation of the protrusion 327 is made easier. Furthermore, even when the carrier 32 and the first sleeve 21 contact with each other, an abnormal sound hardly occurs and resistance caused by friction between the carrier 32 and the first sleeve 21 is prevented.

Further, in the torque sensor 1, the carrier 32 preferably has the protrusions 327. The protrusions 327 are arranged along the circumference about the rotational axis of the first rotating member (input shaft 82a).

With this configuration, even when the carrier 32 and the first sleeve 21 contact with each other, load applied to the protrusion 327 is dispersed and breakage or abrasion of the protrusion 327 is prevented.

Further, in the torque sensor 1, the first sleeve 21 includes the first small-diameter portion 211 in contact with the first rotating member (input shaft 82a), and the first large-diameter portion 212 that deviates in position with respect to the first small-diameter portion 211 in the shaft direction and has the outer diameter larger than the outer diameter of the first small-diameter portion 211. The first large-diameter portion 212 holds the magnet 25.

The configuration prevents deformation of the first large-diameter portion 212 holding the magnet 25 when the first sleeve 21 is pressed into the first rotating member (input shaft 82a). The configuration thus makes a distance between the magnet 25 and the yoke 35 (first teeth 351b and second teeth 352b) unlikely to deviate from a design value. Therefore, the configuration further prevents a reduction in the detection accuracy of the torque sensor 1.

Further, in the torque sensor 1, the carrier 32 includes the second small-diameter portion 321 in contact with the second sleeve 31, and the second large-diameter portion 322 that deviates in position with respect to the second small-diameter portion 321 in the shaft direction and has the outer diameter larger than the outer diameter of the second small-diameter portion 321. The second large-diameter portion 322 holds the yoke 35.

The configuration prevents the deformation of the second large-diameter portion 322 holding the yoke 35 when the second sleeve 31 is pressed into the second rotating member (output shaft 82b). The configuration thus makes the distance between the magnet 25 and the yoke 35 (first teeth 351b and second teeth 352b) unlikely to deviate from the design value. Therefore, the configuration further prevents a reduction in the detection accuracy of the torque sensor 1.

Further, the steering device 80 includes the torque sensor 1.

The configuration can prevent the steering device 80 a reduction in the accuracy of steering torque generated by the electric motor 93. The steering device 80 can appropriately assist steering.

REFERENCE SIGNS LIST

1 Torque sensor
10 Intermediate plate
21 First sleeve
211 First small-diameter portion
212 First large-diameter portion
213 Flange portion
25 Magnet
27 Adhesive
28 Opposing end surface
31 Second sleeve
32 Carrier
321 Second small-diameter portion
322 Second large-diameter portion
327 Protrusion
328 Hole
35 Yoke
351 First yoke
351*a* First ring portion
351*b* First tooth
352 Second yoke
352*a* Second ring portion
352*b* Second tooth
40 Sensor housing
401 Hole
403 Bush
43 Printed board
46 Magnetic flux collecting member
461 First magnetic flux collecting member
462 Second magnetic flux collecting member
47 Hall IC
48 First cover
49 Second cover
491 Body portion
492 Nail portion
71, 72 Bearing
80 Steering device
81 Steering wheel
82 Steering shaft
820 Column housing
82*a* Input shaft
821*a* Groove
822*a* Raised portion
823*a* End surface
82*b* Output shaft
82*c* Torsion bar
83 Steering force assist mechanism
84 Universal joint
85 Intermediate shaft
86 Universal joint
87 Pinion shaft
88 Steering gear
88*a* Pinion
88*b* Rack
89 Tie rod
90 ECU
92 Reduction gear
920 Gearbox
921 Worm wheel
922 Worm
93 Electric motor
95 Vehicle speed sensor
98 Ignition switch
99 Power supply device
C1, C2, C3 Gap

The invention claimed is:

1. A torque sensor, comprising:
a sensor housing;
a first sleeve attached to a first rotating member that rotates with respect to the sensor housing;
a magnet attached to the first sleeve;
a second sleeve attached to a second rotating member coupled to the first rotating member via a torsion bar;
a carrier attached to the second sleeve;
a yoke attached to the carrier and opposing the magnet in a radial direction orthogonal to a shaft direction that is a longitudinal direction of the first rotating member; and
a magnetic flux collecting member attached to the sensor housing and opposing the yoke in the shaft direction, wherein
the carrier opposes an opposing end surface of either one of the first sleeve and the magnet in the shaft direction,
a length of a gap between the carrier and the opposing end surface in the shaft direction is smaller than a length of a gap between the yoke and the magnetic flux collecting member in the shaft direction, and
a length of a gap between an end surface of the second sleeve and an end surface of a raised portion formed on an outer circumferential surface of the second rotating member in the shaft direction is smaller than the length of the gap between the yoke and the magnetic flux collecting member in the shaft direction.

2. The torque sensor according to claim 1, wherein the carrier includes a protrusion opposing the opposing end surface in the shaft direction.

3. The torque sensor according to claim 2, wherein the carrier is made of resin.

4. The torque sensor according to claim 2 or 3, wherein the carrier includes a plurality of the protrusions, and the protrusions are arranged along a circumference about a rotational axis of the first rotating member.

5. The torque sensor according to claim 1, wherein the first sleeve includes a first small-diameter portion in contact with the first rotating member, and a first large-diameter portion that deviates in position with respect to the first small-diameter portion in the shaft direction and has an outer diameter larger than an outer diameter of the first small-diameter portion, and the first large-diameter portion holds the magnet.

6. The torque sensor according to claim 1, wherein the carrier includes a second small-diameter portion in contact with the second sleeve, and a second large-diameter portion that deviates in position with respect to the second small-diameter portion in the shaft direction and has an outer diameter larger than an outer diameter of the second small-diameter portion, and the second large-diameter portion holds the yoke.

7. A steering device, comprising the torque sensor according to claim 1.

* * * * *